(12) United States Patent
Ohara et al.

(10) Patent No.: US 9,743,681 B2
(45) Date of Patent: *Aug. 29, 2017

(54) OIL AND FAT COMPOSITION THAT CAN BE USED AS NON-TEMPERING TYPE HARD BUTTER

(75) Inventors: Atsushi Ohara, Yokosuka (JP); Tomomi Suganuma, Yokosuka (JP); Kiyomi Oonishi, Yokosuka (JP)

(73) Assignee: THE NISSHIN OILLIO GROUP, LTD., Tokyo-To (JP)

( * ) Notice: Subject to any disclaimer, the term of this patent is extended or adjusted under 35 U.S.C. 154(b) by 343 days.

This patent is subject to a terminal disclaimer.

(21) Appl. No.: 14/117,146

(22) PCT Filed: May 8, 2012

(86) PCT No.: PCT/JP2012/061765
§ 371 (c)(1),
(2), (4) Date: Nov. 12, 2013

(87) PCT Pub. No.: WO2012/157470
PCT Pub. Date: Nov. 22, 2012

(65) Prior Publication Data
US 2014/0377445 A1    Dec. 25, 2014

(30) Foreign Application Priority Data

May 17, 2011   (JP) .................. 2011-110625

(51) Int. Cl.
| | |
|---|---|
| A61K 8/92 | (2006.01) |
| A23D 9/00 | (2006.01) |
| A23D 9/02 | (2006.01) |
| C11B 7/00 | (2006.01) |
| C11C 3/10 | (2006.01) |
| A23G 1/36 | (2006.01) |
| A23G 1/38 | (2006.01) |
| A23L 1/00 | (2006.01) |

(52) U.S. Cl.
CPC ............... *A23D 9/00* (2013.01); *A23D 9/02* (2013.01); *A23G 1/36* (2013.01); *A23G 1/38* (2013.01); *C11B 7/0075* (2013.01); *C11C 3/10* (2013.01); *A23V 2002/00* (2013.01)

(58) Field of Classification Search
CPC ........................................ A23D 9/02
See application file for complete search history.

(56) References Cited

U.S. PATENT DOCUMENTS

| | | | |
|---|---|---|---|
| 4,486,457 A * | 12/1984 | Schijf et al. | 426/603 |
| 4,996,074 A * | 2/1991 | Seiden et al. | 426/601 |
| 6,033,695 A * | 3/2000 | Cain et al. | 426/89 |
| 8,304,010 B2 * | 11/2012 | Cleenewerck | 426/607 |
| 2005/0220965 A1 * | 10/2005 | Floeter | 426/601 |
| 2006/0172057 A1 | 8/2006 | Cleenewerck | |
| 2007/0269468 A1 * | 11/2007 | Bach et al. | 424/401 |
| 2008/0199588 A1 * | 8/2008 | Avramis et al. | 426/602 |
| 2010/0215810 A1 * | 8/2010 | Zand et al. | 426/94 |
| 2010/0278985 A1 | 11/2010 | Akahane et al. | |
| 2011/0318453 A1 * | 12/2011 | Suganuma et al. | 426/33 |
| 2012/0295010 A1 * | 11/2012 | Ohara | 426/607 |
| 2013/0230634 A1 * | 9/2013 | Arai et al. | 426/607 |
| 2013/0266716 A1 * | 10/2013 | Bartoccini et al. | 426/603 |
| 2013/0323397 A1 * | 12/2013 | Akahane et al. | 426/607 |

FOREIGN PATENT DOCUMENTS

| | | |
|---|---|---|
| CN | 101035434 A | 9/2007 |
| CN | 101501203 A | 8/2009 |
| CN | 101909453 A | 12/2010 |
| EP | 2 520 174 | 11/2012 |
| JP | 9-316484 | 12/1997 |
| JP | 2001-316484 | 11/2001 |
| JP | 2007-504802 | 3/2007 |
| JP | 2008-516018 | 5/2008 |
| JP | 2009-153425 | 7/2009 |

(Continued)

OTHER PUBLICATIONS

Extended European Search Report dated Oct. 31, 2014 in corresponding European Application No. 12784888.5.
International Search Report dated Aug. 7, 2012 in International (PCT) Application No. PCT/JP2012/061765.
Chinese Office Action dated Jun. 18, 2014 in corresponding Chinese Patent Application No. 201280023737.4 with English translation.
International Preliminary Report on Patentability dated Nov. 19, 2013 and English translation of Written Opinion of the International Searching Authority issued Aug. 7, 2012 in International (PCT) Application No. PCT/JP2012/061765.

*Primary Examiner* — Philip Dubois
(74) *Attorney, Agent, or Firm* — Wenderoth, Lind & Ponack, L.L.P.

(57) ABSTRACT

[Object] To provide an oil and fat composition that can be used as a low trans fatty acid content, non-lauric, non-tempering type hard butter and an oil-based food product comprising the oil and fat composition that exhibits good heat resistance and melting feeling in the mouth.
[Means for Solving the Problems] The oil and fat composition of the present invention is characterized by satisfying the following conditions of (a) to (g):
  (a) an X3 content is 3 to 20% by weight;
  (b) a weight ratio of P3/X3 is not less than 0.35;
  (c) an X2O content is 45 to 80% by weight;
  (d) a weight ratio of XOX/X2O is 0.20 to 0.65;
  (e) a weight ratio of PStO/X2O is 0.10 to 0.45;
  (f) a weight ratio of St2O/X2O is 0.05 to 0.35; and
  (g) a weight ratio of St/P is not more than 0.80;
wherein X represents saturated fatty acid having 14 carbon atoms or more; O represents oleic acid; P represents palmitic acid; and St represents stearic acid.

12 Claims, No Drawings

(56) References Cited

FOREIGN PATENT DOCUMENTS

WO 2005/094598 10/2005
WO 2008/010543 1/2008

* cited by examiner

OIL AND FAT COMPOSITION THAT CAN BE USED AS NON-TEMPERING TYPE HARD BUTTER

CROSS REFERENCE TO RELATED APPLICATION

The present application claims priority under the Paris Convention based on Japan Patent Application 2011-110625. The entire disclosure of this Japan patent application is thus included in the present application.

TECHNICAL FIELD

The present invention relates to an oil and fat composition that can be used as a low trans fatty acid content, non-lauric, non-tempering type hard butter and an oil-based food product comprising the oil and fat composition that exhibits good heat resistance and melting feeling in the mouth.

BACKGROUND ART

Oil-based food products including chocolates are usually solid under storage environment and are characterized by readily melting in the mouth. Chocolates are, as just described, characterized by having both good heat resistance and melting feeling in the mouth.

These characteristics of the chocolate is mainly affected by an oil and fat blended therein. The oil and fat that is most suitable for chocolates is cacao butter. However, because the cacao butter is expensive, cacao butter substitutes prepared from another vegetable oil and fat are often used for the oil and fat in chocolates as well. The cacao butter substitute used as the oil and fat in chocolates is also referred to as hard butter. The hard butter is in general classified into a tempering type and non-tempering type.

Tempering type hard butter contains, as a major component, a symmetric triglyceride which is contained in the cacao butter in a large amount. Hence, it is easy to substitute the tempering type hard butter for the cacao butter and the tempering type hard butter can be mixed to use with the cacao butter in any blending formulation. Further, the tempering type hard butter exhibits sharp melting feeling in the mouth. And when chocolates were produced by use of this tempering type hard butter, tempering is, as in the case of cacao butter, required to be carried out.

On the other hand, the non-tempering type hard butter has melting properties similar to those of the cacao butter but has completely different oils and fats structure. Hence, the non-tempering type hard butter is poorly compatible with the cacao butter. However, the non-tempering type hard butter is cheaper pricewise, as compared with the cacao butter, and does not require cumbersome tempering, which provides ease of handling. Thus, the non-tempering type hard butter is widely used in the field of confectionery production bread making. The non-tempering type hard butter is roughly divided into a lauric acid type and non-lauric type.

Among the non-tempering type hard butter, lauric acid type hard butter contains lauric acid as a major constituent fatty acid. Typically, one obtained by hydrogenating a high melting point fraction (palm kernel stearin) to extremely hydrogenate, which high melting point fraction is obtained by fractionating palm kernel oil, is known. The melting properties of this kind of hard butter are extremely sharp. Yet, because the compatibility thereof with cacao butter is extremely poor, the blending ratio of the cacao butter needs to be set to as low as possible. Hence, chocolates in which the lauric acid type hard butter is used are poor in cocoa flavor. In addition, there is a problem in that, when used in confectionery or bread containing a relatively high amount of water, chocolates in which the lauric acid type hard butter is used generate soap smell if storage conditions are poor.

Among the non-tempering type hard butter, non-lauric type hard butter is also referred to as trans acid type hard butter. Typically, known are one obtained by subjecting liquid oil such as low melting point palm olein or soy bean oil to isomerization hydrogenation; and a high melting point fraction or intermediate melting point fraction obtained by, as necessary, further fractionating the one that has been subjected to the isomerization hydrogenation. The melting properties of non-lauric type hard butter lacks sharpness slightly, as compared with the lauric acid type, whereas the compatibility thereof with the cacao butter is better than that of the lauric acid type and thus more cacao butter can be blended, as compared with the case of the lauric acid type. However, because the non-lauric type hard butter contains a large amount of trans fatty acids, used thereof has been avoided since adverse health effects of the trans fatty acids came to be recognized.

Due to these kinds of the circumstances, the reduction of the trans fatty acids in the non-lauric type hard butter is sought.

As non-lauric type hard butter in which trans fatty acids are reduced, hard butter obtained by mixing, at a specific ration, an oil and fat obtained by hydrogenating an oil and fat containing a specific amount of SUS type triglyceride and an oil and fat containing a specific amount of SSU type triglyceride (see Patent Document 1) and hard butter in which an oil and fat obtained by hydrogenating specific transesterified oil is blended in a specific amount (see Patent Document 2) are known. In these hard butter, the trans fatty acids are reduced to some extent, as compared with conventional trans acid type hard butter. Yet, it could not be said that the reduction was sufficient.

Further, the melting properties of the trans acid type hard butter depend on trans fatty acids contained therein. There is thus a problem in that if the trans fatty acids are reduced, good heat resistance and melting feeling in the mouth of chocolates are impaired.

From the above, development of non-tempering type hard butter that has a low trans fatty acid content and is a non-lauric type is demanded, which non-tempering type hard butter makes it possible to produce oil-based food products including chocolates with good heat resistance and melting feeling in the mouth.

PRIOR ART REFERENCES

Patent Documents

[Patent Document 1] WO 05/094598
[Patent Document 2] Japanese Translated PCT Patent Application Laid-open No. 2007-504802

SUMMARY OF THE INVENTION

Problems to be Solved by the Invention

An object of the present invention is to provide an oil and fat composition that can be used as a low trans fatty acid content, non-lauric, non-tempering type hard butter and an oil-based food product comprising the oil and fat composition that exhibits good heat resistance and melting feeling in the mouth.

Means for Solving the Problems

In order to solve the above problem, the present inventors have intensively studied to find out that, by using an oil and fat composition containing a specific triglyceride and specific constituent fatty acid in a specific composition as non-tempering type hard butter, an oil-based food product with good heat resistance and melting feeling in the mouth could be obtained in spite of the non-tempering type hard butter having a low trans fatty acid content and being non-lauric type, thereby completing the present invention.

Accordingly, one embodiment of the present invention is an oil and fat composition satisfying the following conditions of (a) to (g):
(a) an X3 content is 3 to 20% by weight;
(b) a weight ratio of P3/X3 is not less than 0.35;
(c) an X2O content is 45 to 80% by weight;
(d) a weight ratio of XOX/X2O is 0.20 to 0.65;
(e) a weight ratio of PStO/X2O is 0.10 to 0.45;
(f) a weight ratio of St2O/X2O is 0.05 to 0.35; and
(g) a weight ratio of St/P is not more than 0.80;
(in the above conditions of (a) to (g), each of X, O, P, St, X3, P3, X2O, XOX, PStO, and St2O represents the following:
X: saturated fatty acid having 14 carbon atoms or more;
O: oleic acid;
P: palmitic acid;
St: stearic acid;
X3: triglyceride in which three molecules of X are bound;
P3: triglyceride in which three molecules of P are bound;
X2O triglyceride in which two molecules of X and one molecule of O are bound;
XOX: triglyceride in which X is bound at positions 1 and 3 and O is bound at position 2;
PStO: triglyceride in which one molecule of P, one molecule of St, and one molecule of O are bound; and
St2O: triglyceride in which two molecules of St and one molecule of O are bound).

Another embodiment of the present invention is the above-mentioned oil and fat composition having, in the constituent fatty acids thereof, a lauric acid content of not more than 5% by weight and a trans fatty acid content is not more than 5% by weight.

Another embodiment of the present invention is the above-mentioned oil and fat composition that is non-tempering type hard butter.

Another embodiment of the present invention is an oil-based food product comprising the above-mentioned oil and fat composition.

Another embodiment of the present invention is the above-mentioned oil-based food product that is chocolate.

Another embodiment of the present invention is a method of producing an oil and fat composition characterized by mixing the following transesterified oil A and the following transesterified oil B at a weight ratio of 30:70 to 50:50 to obtain a mixed oil and fractionating the mixed oil to remove a high melting point fraction and a low melting point fraction and to obtain an intermediate melting point fraction:

The transesterified oil A: an oil and fat obtained by subjecting a raw material oil and fat to a random transesterification reaction, the raw material oil and fat having, in constituent fatty acids thereof, a palmitic acid content of 15 to 35% by weight, a stearic acid content of 30 to 55% by weight, an oleic acid content of 15 to 35% by weight, and a total content of linoleic acid and linolenic acid of less than 10% by weight;

The transesterified oil B: an oil and fat obtained by subjecting a raw material oil and fat to a random transesterification reaction, the raw material oil and fat having, in constituent fatty acids thereof, a palmitic acid content of 40 to 60% by weight, a stearic acid content of less than 15% by weight, an oleic acid content of 20 to 45% by weight, and a total content of linoleic acid and linolenic acid of less than 15% by weight.

Another embodiment of the present invention is the above-mentioned method of producing an oil and fat composition characterized by further mixing an oil and fat containing not less than 25% by weight of XOX to the above-mentioned intermediate melting point fraction at a weight ratio of 99:1 to 50:50.

Effect of the Invention

According to the present invention, an oil and fat composition that can be used as a low trans fatty acid content, non-lauric, non-tempering type hard butter and an oil-based food product comprising such an oil and fat composition, which product has good heat resistance and melting feeling in the mouth can be provided.

EMBODIMENTS FOR CARRYING OUT THE INVENTION

An oil and fat composition according to the embodiment of the present invention satisfies the following conditions of (a) to (g):
(a) an X3 content is 3 to 20% by weight;
(b) a weight ratio of P3/X3 is not less than 0.35;
(c) an X2O content is 45 to 80% by weight;
(d) a weight ratio of XOX/X2O is 0.20 to 0.65;
(e) a weight ratio of PStO/X2O is 0.10 to 0.45;
(f) a weight ratio of St2O/X2O is 0.05 to 0.35; and
(g) a weight ratio of St/P is not more than 0.80.

In the oil and fat composition according to the embodiment of the present invention, the X3 content (the condition (a)) is 3 to 20% by weight, preferably 5 to 18% by weight, and more preferably 7 to 16% by weight. With the X3 content being in the above-mentioned range, the heat resistance of the oil-based food product is good.

Note that, in the present invention, X3 is a triglyceride in which three molecules of X are bound (XXX) (triglycerides refers to triacylglycerols in which three molecules of fatty acids are bound to glycerol). Further, in the present invention, X is a saturated fatty acid having 14 carbon atoms or more and preferably a saturated fatty acid having the number of carbon 14 to 20.

In the oil and fat composition according to the embodiment of the present invention, the weight ratio of P3/X3 (the condition (b)) is not less than 0.35, preferably not less than 0.50, and more preferably 0.53 to 0.67. With the weight ratio of P3/X3 being the above-mentioned range, the heat resistance and melting feeling in the mouth of the oil-based food product are good.

Note that, in the present invention, the weight ratio of P3/X3 refers to a ratio of P3 content (% by weight) to X3 content (% by weight). Further, in the present invention, P3 is a triglyceride in which three molecules of P are bound (PPP). Furthermore, in the present invention, P is palmitic acid (saturated fatty acid having 16 carbon atoms).

In the oil and fat composition according to the embodiment of the present invention, the X2O content (the condition (c)) is 45 to 80% by weight, preferably 48 to 75% by weight, and more preferably 50 to 75% by weight. With the X2O content being the above-mentioned range, the heat resistance and melting feeling in the mouth of the oil-based food product are good.

Note that, in the present invention, X2O is a triglyceride in which 2 molecules of X and 1 molecule of O are bound (XXO+XOX+OXX). Further, in the present invention, O is oleic acid (monovalent unsaturated fatty acid having 18 carbon atoms).

In the oil and fat composition according to the embodiment of the present invention, the weight ratio of XOX/X2O (the condition (d)) is 0.20 to 0.65, preferably 0.25 to 0.63, and more preferably 0.28 to 0.60. With the weight ratio of XOX/X2O being the above-mentioned range, the heat resistance and melting feeling in the mouth of the oil-based food product are good.

Note that, in the present invention, the weight ratio of XOX/X2O refers to a ratio of XOX content (% by weight) to X2O content (% by weight). Further, in the present invention, XOX is a triglyceride in which X is bound at positions 1 and 3, and O is bound at position 2.

In the oil and fat composition according to the embodiment of the present invention, the weight ratio of PStO/X2O (the condition (e)) is 0.10 to 0.45, preferably 0.20 to 0.35, and more preferably 0.21 to 0.33. With weight ratio of PStO/X2O being the above-mentioned range, the heat resistance and melting feeling in the mouth of the oil-based food product are good.

Note that, in the present invention, the weight ratio of PStO/X2O refers to a ratio of PStO content (% by weight) to X2O content (% by weight). Further, in the present invention, PStO is a triglyceride in which 1 molecule of P, 1 molecule of St, and 1 molecule of O are bound (PStO+POSt+StPO+StOP+OPSt+OStP). Furthermore, in the present invention, St is stearic acid (saturated fatty acid having 18 carbon atoms).

In the oil and fat composition according to the embodiment of the present invention, the weight ratio of St2O/X2O (the condition (f)) is 0.05 to 0.35, preferably 0.07 to 0.25, and more preferably 0.09 to 0.23. With the weight ratio of St2O/X2O being the above-mentioned range, the heat resistance and melting feeling in the mouth of the oil-based food product are good.

Note that, in the present invention, the weight ratio of St2O/X2O refers to a ratio of St2O content (% by weight) to X2O content (% by weight). Further, in the present invention, St2O is a triglyceride in which 2 molecules of St and 1 molecule of O are bound (StStO+StOSt+OStSt).

In the oil and fat composition according to the embodiment of the present invention, the weight ratio of St/P (the condition (g)) is not more than 0.80, preferably not more than 0.65, and more preferably 0.25 to 0.55. With the weight ratio of St/P being the above-mentioned range, the heat resistance and melting feeling in the mouth of the oil-based food product are good.

Note that, in the present invention, the weight ratio of St/P is a ratio of stearic acid content (% by weight) in constituent fatty acids to palmitic acid content (% by weight) in constituent fatty acids.

In the oil and fat composition according to the embodiment of the present invention, the lauric acid content in constituent fatty acids is preferably not more than 5% by weight, more preferably not more than 2% by weight, and still more preferably not more than 1% by weight. With the lauric acid content being the above-mentioned range, the oil and fat composition is suitable for non-tempering type hard butter that is non-lauric type. Note that, in the present invention, lauric acid (saturated fatty acid having 12 carbon atoms) is in some cases described also as La.

In the oil and fat composition according to the embodiment of the present invention, the trans fatty acid content in constituent fatty acids is preferably not more than 5% by weight, more preferably not more than 3% by weight, and still more preferably not more than 1% by weight. With the trans acid content being the above-mentioned range, the oil and fat composition is suitable for non-tempering type hard butter that has a low trans fatty acid content. Note that, in the present invention, trans fatty acids are in some cases described also as TFAs.

In the oil and fat composition according to the embodiment of the present invention, the palmitic acid content in constituent fatty acids is preferably 35 to 60% by weight, more preferably 37 to 58% by weight, and still more preferably 40 to 55% by weight.

In the oil and fat composition according to the embodiment of the present invention, the stearic acid content in constituent fatty acids is preferably 8 to 30% by weight, more preferably 10 to 28% by weight, and still more preferably 12 to 25% by weight.

In the oil and fat composition according to the embodiment of the present invention, the content of fatty acid having 16 carbon atoms or more (preferably fatty acid having 16 to 24 carbon atoms) is preferably not less than 95% by weight, more preferably not less than 97% by weight, and still more preferably not less than 98% by weight. Note that, in the present invention, fatty acids having 16 carbon atoms or more are in some cases described also as FAs with C16 or more.

In the oil and fat composition according to the embodiment of the present invention, the P3 content is preferably 2 to 20% by weight, more preferably 3 to 15% by weight, and still more preferably 4 to 10% by weight.

In the oil and fat composition according to the embodiment of the present invention, the XOX content is preferably not more than 55% by weight, more preferably 10 to 50% by weight, and still more preferably 15 to 48% by weight.

In the oil and fat composition according to the embodiment of the present invention, the P2O content is preferably 20 to 55% by weight, more preferably 25 to 53% by weight, and still more preferably 30 to 50% by weight. Note that, in the present invention, P2O is a triglyceride in which 2 molecules of P and 1 molecule of O (PPO+POP+OPP).

In the oil and fat composition according to the embodiment of the present invention, the PStO content is preferably 10 to 30% by weight, more preferably 10 to 28% by weight, and still more preferably 12 to 25% by weight.

In the oil and fat composition according to the embodiment of the present invention, the St2O content is preferably 3 to 20% by weight, more preferably 5 to 18% by weight, and still more preferably 5 to 15% by weight.

In the oil and fat composition according to the present embodiment, the solid fat content (hereinafter refers to as SFC) is preferably 40 to 75% at 25° C., 20 to 50% at 30° C., and 5 to 35% at 35° C.; more preferably 45 to 70% at 25° C., 25 to 45% at 30° C., and 10 to 30% at 35° C.; and still more preferably 48 to 65% at 25° C., 27 to 40% at 30° C., and 10 to 25% at 35° C.

In the oil and fat composition according to the embodiment of the present invention, the iodine value is preferably 22 to 47, more preferably 25 to 45, and still more preferably 27 to 43.

In the oil and fat composition according to the embodiment of the present invention, the melting point is preferably 30 to 45° C., more preferably 33 to 45° C., and still more preferably 35 to 43° C. Note that, in the present invention, the melting point refers to the softening point.

A fatty acid content and trans fatty acid content can be measured in accordance with AOCS Ce1f-96.

An X3 triglyceride content, P3 triglyceride content, X2O triglyceride content, P2O triglyceride content, St2O triglyceride content, and PStO triglyceride content can be measured in accordance with JAOCS. vol. 70, 11, 1111-1114 (1993).

An XOX triglyceride content can be calculated based on an XOX/X2O ratio and X2O triglyceride content, wherein the value of XOX/X2O ratio is measured by a method in accordance with J. High Resol. Chromatogr., 18, 105-107 (1995).

SFC can be measured in accordance with IUPAC method 2.150a Solid Content determination in Fats by NMR.

The iodine value can be measured in accordance with "2.3.4.1-1996 iodine value (Wijs-cyclohexane method)" in "Standard Methods for Analysis of Fats, Oils and Related Materials (edited by incorporated association Japan Oil Chemists' Society)".

The melting point can be measured in accordance with "3.2.2.2-1996 melting point (softening point)" in "Standard Methods for Analysis of Fats, Oils and Related Materials (edited by incorporated association Japan Oil Chemists' Society)".

To the oil and fat composition according to the embodiment of the present invention, components other than the oil and fat such as additives can be added. Concrete examples of the additive include, emulsifiers (lecithin, lysolecithin, sorbitan esters of fatty acids, polyglycerin esters of fatty acids, sucrose esters of fatty acids, polyoxyethylenesorbitan esters of fatty acids, polyglycerol polyricinoleate, glycerol esters of fatty acids (monoglyceride), glycerin organic acid esters of fatty acids, propylene glycol esters of fatty acids, or the like), tocopherol, tea extracts (catechin or the like), antioxidants such as rutin, and flavoring agents. In the oil and fat composition according to the embodiment of the present invention, the content of components other than the oil and fat is preferably not more than 5% by weight, more preferably not more than 3% by weight, and still more preferably not more than 1% by weight.

The oil and fat composition according to the embodiment of the present invention is not particularly restricted as long as the composition of triglycerides, the composition of constituent fatty acids and the like are within the above-mentioned, and can be produced by using an usual edible oil and fat. The oil and fat composition according to the embodiment of the present invention can be produced by, for example, mixing the following transesterified oil A and the following transesterified oil B to obtain mixed oil and removing a high melting point fraction and low melting point fraction by fractionating such mixed oil to obtain an intermediate melting point fraction.

The transesterified oil A used in the present invention is an oil and fat obtained by subjecting a raw material oil and fat to a random transesterification reaction, wherein, in the constituent fatty acids of the raw material oil and fat, the palmitic acid content is 15 to 35% by weight, the stearic acid content is 30 to 55% by weight, the oleic acid content is 15 to 35% by weight, and the total content of linoleic acid (divalent unsaturated fatty acid having 18 carbon atoms) and linolenic acid (trivalent unsaturated fatty acid having 18 carbon atoms) is less than 10% by weight.

With regard to the raw material oil and fat of the transesterified oil A used in the present invention, the palmitic acid content in the constituent fatty acids is 15 to 35% by weight, the stearic acid content in the constituent fatty acids is 30 to 55% by weight, the oleic acid content in the constituent fatty acids is 15 to 35% by weight, and the total content of linoleic acid and linolenic acid in the constituent fatty acids is less than 10% by weight; preferably the lauric acid content in the constituent fatty acids is less than 3% by weight, the palmitic acid content in the constituent fatty acids is 17 to 33% by weight, the stearic acid content in the constituent fatty acids is 32 to 53% by weight, the oleic acid content in the constituent fatty acids is 17 to 33% by weight, and the total content of linoleic acid and linolenic acid in the constituent fatty acids is less than 8% by weight; and still more preferably the lauric acid contents in the constituent fatty acids less than 1% by weight, the palmitic acid content in the constituent fatty acids is 20 to 30% by weight, the stearic acid content in the constituent fatty acids is 35 to 50% by weight, the oleic acid content in the constituent fatty acids is 20 to 30% by weight, the total content of linoleic acid and linolenic acid in the constituent fatty acids is less than 6% by weight.

Concrete examples of the raw material oil and fat of the transesterified oil A used in the present invention include mixed oil containing an oil and fat having a total content of linoleic acid and linolenic acid of less than 10% by weight, palm oil, palm fractionated oil having an iodine value of 25 to 48, and an oil and fat having an iodine value of not more than 5 and having the content of saturated fatty acid having 16 carbon atoms or more of not less than 90% by weight.

In the oil and fat having an total content of linoleic acid and linolenic acid of less than 10% by weight, the oleic acid content is preferably not less than 50% by weight. Concrete examples of the oil and fat having an total content of linoleic acid and linolenic acid of less than 10% by weight include high oleic sunflower oil.

Palm fractionated oil is an oil and fat obtained by fractionating palm oil. An oil and fat obtained by fractionating the palm fractionated oil is also palm fractionated oil. Concrete examples of palm fractionated oil having an iodine value of 25 to 48 include palm stearin (a high melting point fraction obtained by fractionating palm oil), palm mid-fraction (a high melting point fraction obtained by further fractionating a low melting point fraction obtained by fractionating palm oil), and hard PMF (a high melting point fraction obtained by further fractionating a palm mid-fraction). The iodine value of palm fractionated oil having an iodine value of 25 to 48 is preferably 28 to 40 and more preferably 30 to 40.

Concrete examples of an oil and fat having an iodine value of not more than 5 and having the content of saturated fatty acid having 16 carbon atoms or more of not less than 90% by weight include extremely hydrogenated oils of soy bean oil, canola oil, cotton seed oil, sunflower oil, safflower oil, corn oil, palm oil, palm fractionated oil, and the like.

The transesterified oil B used in the present invention is an oil and fat obtained by subjecting a raw material oil and fat to a random transesterification reaction, wherein, in the constituent fatty acids of the raw material oil and fat, the palmitic acid content is 40 to 60% by weight, the stearic acid content is less than 15% by weight, the oleic acid content is 20 to 45% by weight, and the total content of linoleic acid and linolenic acid is less than 15% by weight.

With regard to the raw material oil and fat of the transesterified oil B used in the present invention, the palmitic acid content in the constituent fatty acids is 40 to 60% by weight, the stearic acid content in the constituent fatty acids is less than 15% by weight, the oleic acid content in the constituent fatty acids is 20 to 45% by weight, and the total content of linoleic acid and linolenic acid in the constituent fatty acids is less than 15% by weight; preferably the lauric acid content in the constituent fatty acids is less than 3% by weight, the palmitic acid content in the constituent fatty acids is 43 to 57% by weight, the stearic acid content in the constituent fatty acids is less than 10% by weight, the oleic acid content in the constituent fatty acids is 23 to 42% by weight, and the total content of linoleic acid and linolenic acid in the constituent fatty acids is less than 12% by weight; and still more preferably the lauric acid contents in the constituent fatty acids less than 1% by weight, the palmitic acid content in the constituent fatty acids is 47 to 55% by weight, the stearic acid content in the constituent fatty acids is less than 8% by weight, the oleic acid content in the constituent fatty acids is 25 to 40% by weight, the total content of linoleic acid and linolenic acid in the constituent fatty acids is less than 10% by weight.

Concrete examples of the raw material oil and fat of the transesterified oil B used in the present invention include mixed oil containing palm fractionated oil having an iodine value of 25 to 48 and palm oil or the like. The palm fractionated oil having an iodine value of 25 to 48 is as described above.

A transesterification reaction for obtaining the transesterified oil A and transesterified oil B used in the present invention is not particularly restricted as long as it is a random transesterification reaction (referred to also as a non-selective transesterification reaction or transesterification reaction with low regiospecifisity), and can be carried out by a usual method. The random transesterification reaction can be carried out by a method of either chemical transesterification with a synthetic catalyst such as sodium methoxide being used or enzymatic transesterification with lipase (lipase with low regiospecifisity) being used as a catalyst.

The chemical transesterification reaction can be carried out by, for example, drying raw material oils and fats sufficiently, adding sodium methoxide in 0.1 to 1% by weight based on the raw material oil and fat, and then subjecting the resultant to a reaction with stirring under reduced pressure at 80 to 120° C. for 0.5 to 1 hour.

The enzymatic transesterification can be carried out by, for example, adding lipase powder or immobilized lipase 0.02 to 10% by weight, preferably 0.04 to 5% by weight based on the raw material oil and fat and then subjecting the resultant to a reaction with stirring at 40 to 80° C. and preferably at 40 to 70° C. for 0.5 to 48 hours and preferably for 0.5 to 24 hours.

With regard to mixed oil of the transesterified oil A and transesterified oil B for obtaining the oil and fat composition of the present invention, the weight ratio (transesterified oil A:transesterified oil B) is preferably 30:70 to 50:50, more preferably 33:67 to 47:53, and still more preferably 35:65 to 45:55. The mixing can be carried out by a usual method.

The oil and fat composition according to the embodiment of the present invention can be produced by fractionating mixed oil of the transesterified oil A and transesterified oil B to remove a high melting point fraction and thereby obtain a low melting point fraction and further fractionating the obtained low melting point fraction to remove a low melting point fraction and thereby obtain a high melting point fraction. That is, the oil and fat composition according to the embodiment of the present invention can be produced by fractionating mixed oil of the transesterified oil A and transesterified oil B to obtain an intermediate melting point fraction of the mixed oil of the transesterified oil A and transesterified oil B. Note that, in the present invention, the intermediate melting point fraction of the mixed oil of the transesterified oil A and transesterified oil B is in some cases described also as EBMF.

Further, the oil and fat composition according to the embodiment of the present invention can be produced also by mixing EBMF and an oil and fat containing XOX in an amount of not less than 25% by weight. The mixing can be carried out by a usual method. Note that, in the present invention, the oil and fat containing XOX in an amount of not less than 25% by weight is in some cases described also as an XOX oil and fat.

A mix ratio of EBMF and the XOX oil and fat for obtaining the oil and fat composition of the present invention is, in terms of weight ratio (EBMF:XOX oil and fat), preferably 99:1 to 50:50, more preferably 90:10 to 55:45, and still more preferably 80:20 to 60:40.

In the XOX oil and fat used in the present invention, the XOX content is not less than 25% by weight, preferably 25 to 85% by weight, and more preferably 30 to 80% by weight.

Concrete examples of the XOX oil and fat used in the present invention include palm oil, and palm fractionated oil having an iodine value of 25 to 60. The palm fractionated oil is as described above. Concrete examples of the palm fractionated oil having an iodine value of 25 to 60 include palm olein (a low melting point fraction obtained by fractionating palm oil), palm stearin, a palm mid-fraction, and hard PMF. The iodine value of the palm fractionated oil having an iodine value of 25 to 60 is preferably 28 to 60 and more preferably 30 to 58.

A fractionation method for obtaining the oil and fat composition of the present invention is particularly restricted, and can be carried out by a usual method such as dry fractionation (natural fractionation), emulsification fractionation (detergent fractionation), or solvent fractionation. The fractionation method for obtaining the oil and fat composition of the present invention is preferably dry fractionation or solvent fractionation. The dry fractionation can be in general carried out by cooling with stirring a raw material oil and fat to be fractionated in a bath to separate out crystals and then, followed by compression and/or filtration, thereby separating a high melting point fraction (referred to also as a hard fraction or crystalline fraction) and a low melting point fraction (referred to also as a soft fraction or liquid fraction). The solvent fractionation can be carried out dissolving a raw material oil and fat to be fractionated in a solvent such as acetone or hexane and cooling the solution to separate out crystals, followed by filtration, thereby separating a high melting point fraction and a low melting point fraction. Fractionation temperature varies in the properties of fractionated oil and fat that are required. The fractionation temperature of the dry fractionation is preferably 33 to 45° C., more preferably 35 to 43° C., and still more preferably 35 to 40° C. The fractionation temperature of the solvent fractionation is preferably −10 to 10° C., more preferably −8 to 8° C., and still more preferably −6 to 5° C.

Similarly to production of usual edible oil and fat, the oil and fat composition according to the embodiment of the present invention can be subjected to purification treatment (deacidification, decoloration, deodorization, or the like).

The oil and fat composition according to the embodiment of the present invention can be used in oil-based food products as hard butter (oil and fat of chocolates), oil and fat for butter cream, or the like. The hard butter can be used as non-tempering type hard butter. In particular, the non-tempering type hard butter can be used as non-tempering type hard butter that has a low trans fatty acid content and is non-lauric type.

The oil-based food product according to the embodiment of the present invention is characterized by comprising the oil and fat composition according to the embodiment of the present invention. That is, the oil-based food product according to the embodiment of the present invention is characterized by being produced by using the oil and fat composition according to the embodiment of the present invention. In the present invention, the oil-based food product refers to a processed food product containing an oil and fat, wherein the oil and fat is a continuous phase. The oil-based food product preferably contains sugar group. Concrete examples of the oil-based food product include chocolate, and butter cream (sand cream, filling cream or the like).

The oil-based food product according to the embodiment of the present invention is preferably chocolate. In the present invention, chocolate is not limited by the code "Fair Competition Codes concerning Labeling on Chocolates" (Japan Chocolate Industry Fair Trade Conference) or by definitions covered in laws and regulations, and refers to one produced by using edible fats and oils and sugar group as major raw materials; adding, as necessary, cacao components (cacao mass, cocoa powder, or the like), dairy products, flavoring agents, emulsifiers or the like; and subjecting them to the steps of chocolate production (mixing step, refining step, conching step, cooling step, and the like). Further, the chocolates in the present invention also include white chocolate and colored chocolate, in addition to dark chocolate and milk chocolate.

In the oil-based food product according to the embodiment of the present invention, the content of the oil and fat composition according to the embodiment of the present invention (a blended amount), preferably 5 to 100% by weight, more preferably 40 to 100% by weight, and still more preferably 60 to 100% by weight in the oil and fat of the oil-based food product. Note that, in the present invention, the oil and fat of the oil-based food product also include, in addition to the blended oil and fat, oil and fat (cacao butter, cream or the like) in oil-containing raw materials (cacao mass, whole milk powder or the like).

In the oil-based food product according to the embodiment of the present invention, besides the oil and fat composition according to the embodiment of the present invention, food product materials that are generally used in oil-based food products such as sugar group, cacao component, emulsifier, dairy products, or flavoring agents can be blended.

The oil-based food product according to the embodiment of the present invention can be produced by a usual method. In cases where the oil-based food product according to the embodiment of the present invention is chocolate, it can be produced without carrying out tempering.

The oil-based food product according to the embodiment of the present invention can be combined with a food product such as confectionery or bread in a form of chocolate, butter cream, or the like.

The oil-based food product according to the embodiment of the present invention is one in which the lauric acid content and trans fatty acid content in the constituent fatty acids of oil and fat are low, and the heat resistance and melting feeling in the mouth good.

EXAMPLES

By way of the examples the present invention will now be described but the present invention is by no means limited thereto.

(Methods of Analysis)

A fatty acid content and trans fatty acid content were measured by methods in accordance with AOCS Ce1f-96.

An X3 triglyceride content, P3 triglyceride content, X2O triglyceride content, P2O triglyceride content, St2O triglyceride content, and PStO triglyceride content were measured by methods in accordance with JAOCS. vol. 70, 11, 1111-1114 (1993).

An XOX triglyceride content was calculated based on an XOX/X2O ratio and X2O triglyceride content, wherein the value of XOX/X2O ratio was measured by a method in accordance with J. High Resol. Chromatogr., 18, 105-107 (1995).

SFC was measured by a method in accordance with IUPAC method 2.150a Solid Content determination in Fats by NMR.

An iodine value was measured by a method in accordance with "2.3.4.1-1996 iodine value (Wijs-cyclohexane method)" in "Standard Methods for Analysis of Fats, Oils and Related Materials (edited by incorporated association Japan Oil Chemists' Society)".

The melting point was measured by a method in accordance with "3.2.2.2-1996 melting point (softening point)" in "Standard Methods for Analysis of Fats, Oils and Related Materials (edited by incorporated association Japan Oil Chemists' Society)".

(Production of Transesterified Oil A1)

Twenty two parts by weight of high oleic sunflower oil (oleic acid content: 85.1% by weight, linoleic acid content: 6.6% by weight, linolenic acid content: 0.1% by weight), 31 parts by weight of palm stearin (iodine value: 36.1) and 47 parts by weight of extremely hydrogenated oil of soy bean oil (iodine value: 1.1, the content of saturated fatty acid having 16 carbon atoms or more: 99.5% by weight) were mixed. The obtained mixed oil (lauric acid content: 0.1% by weight, palmitic acid content: 24.7% by weight, stearic acid: 43.0% by weight, oleic acid: 26.7% by weight, linoleic acid: 3.8% by weight, linolenic acid: 0.1% by weight, trans fatty acid: 0% by weight) was subjected to a random transesterification reaction to obtain transesterified oil A1.

The transesterification reaction was carried out according to a conventional method, wherein a raw material oil and fat was sufficiently dried and sodium methoxide was added in 0.2% by weight based on the raw material oil and fat, the resultant was reacted while stirred under reduced pressure at 120° C. for 0.5 hours.

(Production of Transesterified Oil A2)

Twenty seven point five parts by weight of the following oil and fat composition a (linoleic acid content: 6.9% by weight, linolenic acid content: 0% by weight), 34.5 parts by weight of palm stearin (iodine value: 36.1), and 38 parts by weight of extremely hydrogenated oil of soy bean oil (iodine value: 1.1, the content of saturated fatty acid having 16 carbon atoms or more: 99.5% by weight) were mixed. The obtained mixed oil (lauric acid content: 0.1% by weight, palmitic acid content: 24.8% by weight, stearic acid: 43.9% by weight, oleic acid: 25.6% by weight, linoleic acid: 4.1% by weight, linolenic acid: 0.1% by weight, trans fatty acid: 0% by weight) was subjected to a random transesterification reaction to obtain transesterified oil A2.

The transesterification reaction was carried out by the same method as described in the above transesterified oil A1.

(Production of Transesterified Oil A3)

Twenty five parts by weight of the following oil and fat composition a (linoleic acid content: 6.9% by weight, linolenic acid content: 0% by weight), 40 parts by weight of palm stearin (iodine value: 36.1), and 35 parts by weight of extremely hydrogenated oil of the following oil and fat composition a (iodine value: 1.3, the content of saturated fatty acid having 16 carbon atoms or more: 99.9% by weight) were mixed. The obtained mixed oil (lauric acid content: 0.1% by weight, palmitic acid content: 25.4% by weight, stearic acid: 42.6% by weight, oleic acid: 26.1% by weight, linoleic acid: 4.3% by weight, linolenic acid: 0.1% by weight, trans fatty acid: 0% by weight) was subjected to a random transesterification reaction to obtain transesterified oil A3.

The transesterification reaction was carried out by the same method as described in the above transesterified oil A1.

(Production of Transesterified Oil A4)

Fifty parts by weight of palm olein (iodine value: 56.7, linoleic acid content: 11.2% by weight, linolenic acid content: 0.3% by weight) and 50 parts by weight of extremely hydrogenated oil of soy bean oil (iodine value: 1.1, the content of saturated fatty acid having 16 carbon atoms or more: 99.5% by weight) were mixed. The obtained mixed oil (lauric acid content: 0.1% by weight, palmitic acid content: 24.7% by weight, stearic acid: 46.5% by weight, oleic acid: 21.3% by weight, linoleic acid: 5.7% by weight, linolenic acid: 0.1% by weight, trans fatty acid: 0.1% by weight) was subjected to a random transesterification reaction to obtain transesterified oil A4.

The transesterification reaction was carried out by the same method as described in the above transesterified oil A1.

(Production of Transesterified Oil B1)

Sixty parts by weight of palm stearin (iodine value: 36.1) and 40 parts by weight of palm oil (iodine value: 52.0) were mixed. The obtained mixed oil (lauric acid content: 0.2% by weight, palmitic acid content: 517% by weight, stearic acid: 4.6% by weight, oleic acid: 33.2% by weight, linoleic acid: 8.0% by weight, linolenic acid: 0.2% by weight, trans fatty acid: 0% by weight) was subjected to a random transesterification reaction to obtain transesterified oil B1.

The transesterification reaction was carried out by the same method as described in the above transesterified oil A1.

(Production of Oil and Fat Composition a)

An oil and fat obtained by subjecting transesterified oil of high oleic sunflower oil and ethyl stearate to dry fractionation was designated as an oil and fat composition a.

(Production of Oil and Fat Composition of Example 1)

Forty parts by weight of transesterified oil A1 and 60 parts by weight of transesterified oil B1 were mixed. The obtained mixed oil was subjected to dry fractionation at 36 to 38° C. and a high melting point fraction was removed, thereby obtaining a low melting point fraction. The obtained low melting point fraction was subjected to solvent fractionation (using acetone) at 0 to 2° C., and a low melting point fraction was removed, thereby obtaining a high melting point fraction, which was subjected to deodorization treatment. The resultant was designated as an oil and fat composition (EBMF) of Example 1.

(Production of Oil and Fat Composition of Example 2)

Forty parts by weight of transesterified oil A2 and 60 parts by weight of transesterified oil B1 were mixed. The obtained mixed oil was subjected to dry fractionation at 36 to 38° C. and a high melting point fraction was removed, thereby obtaining a low melting point fraction. The obtained low melting point fraction was subjected to solvent fractionation (using acetone) at 0 to 2° C., and a low melting point fraction was removed, thereby obtaining a high melting point fraction. The resultant was designated as an oil and fat composition (EBMF) of Example 2.

(Production of Oil and Fat Composition of Example 3)

Forty parts by weight of transesterified oil A1 and 60 parts by weight of transesterified oil B1 were mixed. The obtained mixed oil was subjected to dry fractionation at 36 to 38° C. and a high melting point fraction was removed, thereby obtaining a low melting point fraction. The obtained low melting point fraction was subjected to solvent fractionation (using acetone) at −4 to −2° C., and a low melting point fraction was removed, thereby obtaining a high melting point fraction, which was subjected to deodorization treatment. The resultant was designated as an oil and fat composition (EBMF) of Example 3.

(Production of Oil and Fat Composition of Example 4)

Seventy parts by weight of the oil and fat composition of Example 1 and 30 parts by weight of palm olein (iodine value: 56.7, XOX content: 32.7% by weight) were mixed and this resultant was designated as an oil and fat composition (mixed oil of EBMF and XOX oil and fat) of Example 4.

(Production of Oil and Fat Composition of Example 5)

Sixty parts by weight of the oil and fat composition of Example 1 and 40 parts by weight of palm mid-fraction (iodine value: 45.5, XOX content: 53.3% by weight) were mixed and this resultant was designated as an oil and fat composition (mixed oil of EBMF and XOX oil and fat) of Example 5.

(Production of Oil and Fat Composition of Comparative Example 1) The transesterified oil A2 was subjected to dry fractionation at 36 to 38° C. and a high melting point fraction was removed, thereby obtaining a low melting point fraction. Sixty parts by weight of the obtained low melting point fraction and 40 parts by weight of palm mid-fraction (iodine value: 45.5, lauric acid content: 0.2% by weight, palmitic acid content: 48.9% by weight, stearic acid: 4.8% by weight, oleic acid: 36.1% by weight, linoleic acid: 7.8% by weight, linolenic acid: 0% by weight, trans fatty acid: 0% by weight) were mixed. The obtained mixed oil was subjected to solvent fractionation (using acetone) at −2 to 0° C., and a low melting point fraction was removed, thereby obtaining a high melting point fraction. The resultant was designated as an oil and fat composition of Comparative Example 1.

(Production of Oil and Fat Composition of Comparative Example 2)

The transesterified oil A3 was subjected to dry fractionation at 36 to 38° C. and a high melting point fraction was removed, thereby obtaining a low melting point fraction. Eighty four parts by weight of the obtained low melting point fraction and 16 parts by weight of palm mid-fraction (iodine value: 45.5, lauric acid content: 0.2% by weight, palmitic acid content: 48.9% by weight, stearic acid: 4.8% by weight, oleic acid: 36.1% by weight, linoleic acid: 7.8% by weight, linolenic acid: 0% by weight, trans fatty acid: 0% by weight) were mixed. The obtained mixed oil was subjected to solvent fractionation (using acetone) at −4 to −2° C., and a low melting point fraction was removed, thereby obtaining a high melting point fraction. The resultant was designated as an oil and fat composition of Comparative Example 2.

(Production of Oil and Fat Composition of Comparative Example 3)

The transesterified oil A3 was subjected to dry fractionation at 36 to 38° C. and a high melting point fraction was removed, thereby obtaining a low melting point fraction.

Sixty parts by weight of the obtained low melting point fraction and 40 parts by weight of palm mid-fraction (iodine value: 45.5, lauric acid content: 0.2% by weight, palmitic acid content: 48.9% by weight, stearic acid: 4.8% by weight, oleic acid: 36.1% by weight, linoleic acid: 7.8% by weight, linolenic acid: 0% by weight, trans fatty acid: 0% by weight) were mixed. The obtained mixed oil was subjected to solvent fractionation (using acetone) at −2 to 0° C., and a low melting point fraction was removed, thereby obtaining a high melting point fraction. The resultant was designated as an oil and fat composition of Comparative Example 3.

(Production of Oil and Fat Composition of Comparative Example 4)

The transesterified oil A4 was subjected to dry fractionation at 36 to 38° C. and a high melting point fraction was removed, thereby obtaining a low melting point fraction. The obtained low melting point fraction was further subjected to dry fractionation and a low melting point fraction was removed, thereby obtaining a high melting point fraction. The resultant was designated as an oil and fat composition of Comparative Example 4.

(Analysis of Oil and Fat Compositions of Examples and Comparative Examples)

For the oil and fat compositions of Examples 1 to 5 and oil and fat composition of Comparative examples 1 to 4, the fatty acid content, triglyceride content, iodine value, melting point, and SFC were measured according to the methods of analysis that were described earlier. The results are shown in Tables 1 and 2.

As can be seen from Tables 1 and 2, oil and fat compositions of Examples and Comparative Examples were low in the lauric acid content and trans fatty acid content.

TABLE 1

Triglyceride content and fatty acid content (% by weight), triglyceride and fatty acid weight ratio, iodine value, melting point (° C.), and SFC (%) of oil and fat composition

|  | Example 1 | Example 2 | Example 3 | Example 4 | Example 5 |
|---|---|---|---|---|---|
| X3 content | 13.2 | 11.5 | 11.5 | 10.1 | 9.2 |
| P3/X3 weight ratio | 0.606 | 0.617 | 0.591 | 0.604 | 0.609 |
| X2O content | 66.1 | 71.3 | 56.3 | 57.4 | 63.2 |
| XOX/X2O weight ratio | 0.349 | 0.320 | 0.352 | 0.462 | 0.554 |
| PStO/X2O weight ratio | 0.281 | 0.279 | 0.277 | 0.256 | 0.233 |
| St2O/X2O weight ratio | 0.165 | 0.177 | 0.155 | 0.136 | 0.111 |
| St/P weight ratio | 0.431 | 0.482 | 0.410 | 0.341 | 0.293 |
| P3 content | 8.0 | 7.1 | 6.8 | 6.1 | 5.6 |
| XOX content | 23.1 | 22.8 | 19.8 | 26.5 | 35.0 |
| P2O content | 34.6 | 36.5 | 30.3 | 33.1 | 39.7 |
| PStO content | 18.6 | 19.9 | 15.6 | 14.7 | 14.7 |
| St2O content | 10.9 | 12.6 | 8.7 | 7.8 | 7.0 |
| La content | 0.2 | 0.2 | 0.2 | 0.2 | 0.2 |
| P content | 45.9 | 45.2 | 42.4 | 44.3 | 47.1 |
| St content | 19.8 | 21.8 | 17.4 | 15.1 | 13.8 |
| Content of FA having C16 or more | 98.8 | 98.8 | 98.8 | 98.7 | 98.8 |
| TFA content | 0.4 | 0.2 | 0.5 | 0.4 | 0.3 |
| Iodine value | 32.0 | 29.9 | 38.0 | 39.5 | 37.2 |
| Melting point | 40.9 | 39.8 | 40.1 | 38.6 | 38.1 |
| SFC 25° C. | 58.3 | 58.8 | 53.2 | 54.0 | 53.8 |
| 30° C. | 36.2 | 34.6 | 34.5 | 31.8 | 32.0 |
| 35° C. | 18.4 | 17.0 | 16.6 | 15.4 | 15.2 |

TABLE 2

Triglyceride content and fatty acid content (% by weight), triglyceride and fatty acid weight ratio, iodine value, melting point (° C.), and SFC (%) of oil and fat compositions

|  | Comparative Example 1 | Comparative Example 2 | Comparative Example 3 | Comparative Example 4 |
|---|---|---|---|---|
| X3 content | 9.0 | 11.3 | 8.5 | 13.3 |
| P3/X3 weight ratio | 0.267 | 0.212 | 0.294 | 0.182 |
| X2O content | 71.5 | 69.5 | 72.7 | 63.8 |
| XOX/X2O weight ratio | 0.606 | 0.443 | 0.616 | 0.322 |
| PStO/X2O weight ratio | 0.337 | 0.419 | 0.338 | 0.503 |
| St2O/X2O weight ratio | 0.213 | 0.304 | 0.209 | 0.379 |
| St/P weight ratio | 0.762 | 1.224 | 0.754 | 1.656 |
| P3 content | 2.4 | 2.4 | 2.5 | 2.4 |
| XOX content | 43.3 | 30.8 | 44.8 | 20.6 |
| P2O content | 31.2 | 18.7 | 32.0 | 7.2 |
| PStO content | 24.1 | 29.1 | 24.6 | 32.1 |
| St2O content | 15.2 | 21.1 | 15.2 | 24.2 |
| La content | 0.1 | 0.1 | 0.1 | 0.1 |
| P content | 36.6 | 29.7 | 36.9 | 25.5 |
| St content | 27.9 | 36.3 | 27.8 | 42.1 |
| Content of FA having C16 or more | 99.2 | 99.2 | 99.2 | 99.2 |
| TFA content | 0.2 | 0.3 | 0.2 | 0.1 |
| Iodine value | 32.7 | 31.3 | 32.6 | 31.5 |
| Melting point | 39.7 | 40.4 | 38.5 | 42.3 |
| SFC 25° C. | 37.0 | 45.0 | 33.6 | 63.7 |
| 30° C. | 20.3 | 24.4 | 17.7 | 38.2 |
| 35° C. | 9.8 | 12.7 | 7.8 | 21.7 |

(Chocolate Evaluation Test)

Using the oil and fat compositions of Examples 1 to 5 and oil and fat compositions of Comparative examples 1 to 4, non-tempering type dark chocolates (the amount of each of the oil and fat compositions blended in the oil and fat: 80.0% by weight) and milk chocolates (the amount of each of the oil and fat compositions blended in the oil and fat: 74.0% by weight) were produced in blending formulation in Tables 3 and 4. Each of the chocolates was produced by a conventional method (mixing, refining, conching, cooling) except that tempering was not carried out.

For the heat resistance and melting feeling in the mouth of the obtained chocolate, 5 expert panels graded at 3 levels of very good (3 points), good (2 points), poor (1 point) and evaluated according the following criteria. The results of the evaluation are shown in Tables 5 and 6.

In each of the evaluations, in cases where ⊚ was given, the heat resistance and melting feeling in the mouth thereof were judged to be good.

⊚: The average score of the 5 panels was not less than 2.0 points.
Δ: The average score of the 5 panels was not less than 1.5 points and less than 2.0 points
X: The average score of the 5 panels was not less than 1 point and less than 1.5 points.

(1) Evaluation of Heat Resistance

Evaluation of heat resistance was carried out by evaluating a state of fingerprints being left on the surface of chocolate when the surface of chocolate was touched by the pad of the index finger. The heat resistance was evaluated according to the following criteria.

Very good: The surface of chocolate was hard and no fingerprints were left.

Good: The surface of chocolate was hard and fingerprints were hardly left.

Poor: The surface of chocolate was soft and fingerprints were left.

(2) Evaluation of Melting Feeling in the Mouth

Chocolate was eaten and the melting feeling in the mouth of the chocolate was evaluated according to the following criteria.

Very good: The melting feeling in the mouth was good and no lingering taste was noted.

Good: The melting feeling in the mouth was good and little lingering taste was noted.

Poor: The melting feeling in the mouth was poor and a lingering taste was noted to a large degree.

TABLE 3

| Blending formulation of dark chocolate (% by weight) | |
|---|---|
| Oil and fat composition | 32.0 |
| Sugar | 52.5 |
| Cacao mass | 15.0 |
| Lecithin | 0.5 |

TABLE 4

| Blending formulation of milk chocolate (% by weight) | |
|---|---|
| Oil and fat composition | 29.2 |
| Sugar | 43.5 |
| Cacao mass | 17.8 |
| Whole milk powder | 9.0 |
| Lecithin | 0.5 |

TABLE 5

Results of chocolate evaluation test

| | | Example 1 | Example 2 | Example 3 | Example 4 | Example 5 |
|---|---|---|---|---|---|---|
| Dark Chocolate | Heat resistance | ◎ | ◎ | ◎ | ◎ | ◎ |
| | Melting feeling in the mouth | ◎ | ◎ | ◎ | ◎ | ◎ |
| Milk Chocolate | Heat resistance | ◎ | ◎ | ◎ | ◎ | ◎ |
| | Melting feeling in the mouth | ◎ | ◎ | ◎ | ◎ | ◎ |

TABLE 6

Results of chocolate evaluation test

| | | Comparative Example 1 | Comparative Example 2 | Comparative Example 3 | Comparative Example 4 |
|---|---|---|---|---|---|
| Dark chocolate | Heat resistance | Δ | ◎ | Δ | ◎ |
| | Melting feeling in the mouth | X | X | X | X |
| Milk chocolate | Heat resistance | Δ | ◎ | Δ | ◎ |
| | Melting feeling in the mouth | X | X | Δ | X |

As can be seen from Table 5, the non-tempering type chocolates produced by using the oil and fat composition of Examples 1 to 5 exhibited good heat resistance and melting feeling in the mouth.

On the other hand, as can be seen from Table 6, the non-tempering type chocolates produced by using the oil and fat composition of Comparative examples 1 to 4 did not have good heat resistance and/or melting feeling in the mouth.

The invention claimed is:

1. An oil and fat composition satisfying the following conditions of (a) to (g):
    (a) an X3 content is 3 to 20% by weight;
    (b) a weight ratio of P3/X3 is 0.50 to 0.67;
    (c) an X2O content is 45 to 80% by weight;
    (d) a weight ratio of XOX/X2O is 0.20 to 0.65;
    (e) a weight ratio of PStO/X2O is 0.10 to 0.45;
    (f) a weight ratio of St2O/X2O is 0.05 to 0.35; and
    (g) a weight ratio of St/P is not more than 0.80;
    (in the above conditions of (a) to (g), each of X, O, P, St, X3, P3, X2O, XOX, PStO, and St2O represents the following:
    X: saturated fatty acid having 14 carbon atoms or more;
    O: oleic acid;
    P: palmitic acid;
    St: stearic acid;
    X3: triglyceride in which three molecules of X are bound;
    P3: triglyceride in which three molecules of P are bound;
    X2O: triglyceride in which two molecules of X and one molecule of O are bound;
    XOX: triglyceride in which X is bound at positions 1 and 3 and O is bound at position 2;
    PStO: triglyceride in which one molecule of P, one molecule of St, and one molecule of O are bound; and
    St2O: triglyceride in which two molecules of St and one molecule of O are bound), wherein (b) said weight ratio of P3/X3 is 0.50 to 0.67.

2. The oil and fat composition according to claim 1, wherein a lauric acid content in constituent fatty acids is not more than 5% by weight and a trans fatty acid content in constituent fatty acids is not more than 5% by weight.

3. The oil and fat composition according to claim 1, wherein said oil and fat composition is non-tempering type hard butter.

4. An oil-based food product comprising said oil and fat composition according to claim 1.

5. The oil-based food product according to claim 4, wherein said oil-based food product is chocolate.

6. The oil and fat composition according to claim 2, wherein said oil and fat composition is non-tempering type hard butter.

7. An oil-based food product comprising said oil and fat composition according to claim 2.

8. An oil-based food product comprising said oil and fat composition according to claim 3.

9. An oil-based food product comprising said oil and fat composition according to claim 6.

10. The oil-based food product according to claim 7, wherein said oil-based food product is chocolate.

11. The oil-based food product according to claim 8, wherein said oil-based food product is chocolate.

12. The oil-based food product according to claim 9, wherein said oil-based food product is chocolate.

* * * * *